United States Patent
Brueckel

(10) Patent No.: US 8,232,744 B2
(45) Date of Patent: Jul. 31, 2012

(54) METHOD FOR THE OPERATION OF AND CIRCUIT ARRANGEMENT FOR LIGHT SOURCES

(75) Inventor: Martin Brueckel, Shenzhen (CN)

(73) Assignee: OSRAM AG, München (DE)

( * ) Notice: Subject to any disclaimer, the term of this patent is extended or adjusted under 35 U.S.C. 154(b) by 186 days.

(21) Appl. No.: 12/864,224

(22) PCT Filed: Jan. 23, 2008

(86) PCT No.: PCT/EP2008/050740
§ 371 (c)(1),
(2), (4) Date: Jul. 22, 2010

(87) PCT Pub. No.: WO2009/092439
PCT Pub. Date: Jul. 30, 2009

(65) Prior Publication Data
US 2010/0295480 A1    Nov. 25, 2010

(51) Int. Cl.
*H05B 37/02* (2006.01)
(52) U.S. Cl. .......................... 315/307; 315/299; 315/312
(58) Field of Classification Search .................. 315/291, 315/209 R, 294, 307, 194, 324, 293, 312, 315/313, 308, 299
See application file for complete search history.

(56) References Cited

U.S. PATENT DOCUMENTS

| | | | | |
|---|---|---|---|---|
| 6,028,776 A | * | 2/2000 | Ji et al. | 363/21.05 |
| 7,023,143 B2 | * | 4/2006 | Harada et al. | 315/209 R |
| 7,923,974 B2 | * | 4/2011 | Martin et al. | 323/212 |
| 2007/0007913 A1 | * | 1/2007 | Ichikawa et al. | 315/291 |

FOREIGN PATENT DOCUMENTS

| | | |
|---|---|---|
| EP | 1 326 483 | 7/2003 |
| EP | 1 422 979 | 5/2004 |
| WO | WO 03/055278 | 7/2003 |
| WO | WO 2004/045256 | 5/2004 |

* cited by examiner

*Primary Examiner* — James H Cho
(74) *Attorney, Agent, or Firm* — Cozen O'Connor

(57) ABSTRACT

A method for the closed-loop control of the operation of a light source which is supplied with power by a DC/DC voltage converter, a manipulated variable being regulated by a setpoint value for an operational parameter of the DC/DC voltage converter being input, wherein the method comprises the steps of: increasing the switching frequency of the DC/DC voltage converter by an increase value prior to rapid changes in the setpoint value; waiting for a retention time; setting the new setpoint value; waiting for the end of a total retention time; and lowering the switching frequency of the DC/DC voltage converter by the increase value.

13 Claims, 3 Drawing Sheets

METHOD FOR THE OPERATION OF AND CIRCUIT ARRANGEMENT FOR LIGHT SOURCES

RELATED APPLICATIONS

This is a U.S. national stage of application No. PCT/EP2008/050740, filed on Jan. 23, 2008, the entire content of which is hereby incorporated by reference.

FIELD OF THE INVENTION

The invention is related to a method for the closed-loop control of a circuit arrangement for light sources whose polarity is reversed at regular intervals or in which considerable changes in current are often required. In this case, particular attention is paid to the magnitude of the overshoots which are triggered by the change in current.

BACKGROUND OF THE INVENTION

So-called square-wave operation is in widespread use in electronic control gear for gas discharge lamps. In this case, a direct current whose polarity is reversed at regular intervals is applied to the lamp. The polarity reversal is necessary in order to avoid electrophoresis effects and in order to subject each electrode of the lamp to an even load. Direct current operation is also in widespread use in gas discharge lamps which are designed specially for this purpose. For particular applications, for example in the projection operating mode, however, rapid changes in current are also required in DC lamps. Very rapid changes in current are also required in projection applications with semiconductor light sources in order to ensure a constant color temperature.

The direct current is generally provided by a pulsed power supply, also referred to below as DC/DC voltage converter. This usually involves known topologies such as buck converters, boost converters, buck-boost converters, Cúk converters or SEPIC converters. The voltage which is supplied to the DC/DC voltage converter is usually higher than the voltage at the light source, for which reason a buck converter is preferably used. The power which the DC/DC voltage converter can provide to a load is generally set by the duty factor or the switching frequency of electronic switches which are contained in the DC/DC voltage converter. For this purpose, the DC/DC voltage converter has a setting input, at which a setpoint value is fed in. If the DC/DC voltage converter is a buck converter, for example, a pulse-width modulator (PWM) is usually used, which converts the setpoint value into a drive signal for the electronic switch contained in the buck converter.

If rapid changes in current now occur in the setpoint value, for example as a result of the polarity reversal of the lamp current or as a result of changes in color in projector systems, the DC/DC voltage converter cannot follow these rapid changes in current. The change in current takes place more slowly and an overshoot response occurs, i.e. the actual value of the current goes beyond the setpoint value and only approaches the setpoint value again after a certain time. As a result, the light source draws more power, which is reflected in an increased, often undesirable light emission. In the case of the projection systems, for example, the color representation can be incorrect as a result of this effect. Owing to the temporarily increased current, undesirable noise emitted by the circuit to the surrounding environment thereof owing to magnetostriction and other mechanisms is also increased.

EP 1 326 483 A1 therefore attempts to avoid the overshoot response as a result of the polarity reversal of the lamp current by virtue of the setpoint value of the current being reduced shortly before the polarity reversal and the desired setpoint value being set again shortly after the polarity reversal. The setpoint variable is therefore decreased in synchronism with the polarity reversal and therefore in synchronism with the switchover signal by a decrease value with a time characteristic. Although this reduces the overshoot response during polarity reversal of the lamp current, i.e. during commutation of the lamp, a contribution cannot always be made to rapid changes in the lamp current which result in a rapid change in the lamp power.

SUMMARY OF THE INVENTION

One object of the present invention is to provide a method for the operation of light sources and control gear for operating light sources, which brings about a rapid change in the light source current with reduced overshoot in comparison with the prior art.

The object as regards the method is achieved according to an embodiment of the invention by a method for the closed-loop control of a light source, which is supplied with power by a DC/DC voltage converter, a manipulated variable being regulated by inputting a setpoint value for an operational parameter of the DC/DC voltage converter, characterized by the following method steps:

increasing the switching frequency of the DC/DC voltage converter by an increase value prior to rapid changes in the setpoint value,
waiting for a retention time ($t_{RZ}$),
setting the new setpoint value,
waiting for the end of a total retention time ($t_2$),
lowering the switching frequency of the DC/DC voltage converter by the increase value.

The object as regards the circuit arrangement is achieved in accordance with an embodiment of the invention by a circuit arrangement for the operation of light sources which has a DC/DC voltage converter and a control circuit, with it being operated by the abovementioned method.

Preferably, the setting of the new setpoint value is performed during the retention time ($t_{RZ}$). Alternatively, the setting of the new setpoint value can also be performed during the total residence time ($t_2$).

Preferably, in this case the light source is operated on a square-wave current. In this case, the rapid changes in the setpoint value can be the polarity reversal of the lamp current.

BRIEF DESCRIPTION OF THE DRAWING(S)

The invention will be explained in more detail below with reference to exemplary embodiments. In the drawings.

DETAILED DESCRIPTION OF THE DRAWINGS

Figure 1:
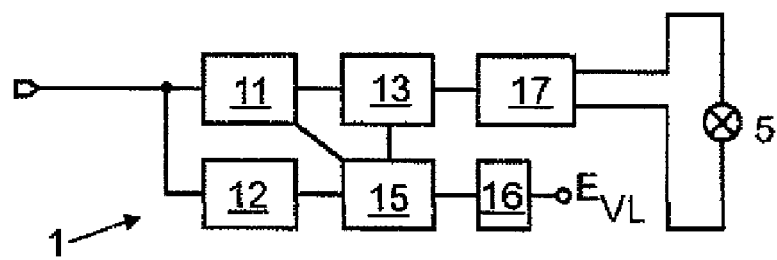
FIG. 1 shows a schematic block circuit diagram of control gear with which the method according to an embodiment of the invention can be implemented.

FIG. 1 shows a schematic block circuit diagram of a control gear 1 with which the method according to the invention can be implemented. The control gear 1 has a 380 V DC voltage input. This voltage is produced if, for example, a 230 V system voltage, as is conventional in Europe and other parts of the world, is rectified and is backed up by a storage capacitor. The voltage is input into a first DC/DC voltage converter 11, which generates a lamp voltage suitable for a gas discharge lamp 5 from the input voltage. This lamp voltage is further-processed in an inverter 13, which forms a square-wave voltage with a frequency of a few 100 Hz from the DC voltage. This square-wave voltage is applied to the gas discharge lamp 5 via a superimposed-pulse starting device 17.

The control gear 1 contains a second DC/DC voltage converter 12, which is designed to supply energy to the control circuit 15. The control circuit 15 controls the first DC/DC voltage converter 11 and the inverter 13 in such a way that the method according to the invention is implemented. In the preferred embodiment, the control gear 1 is designed as control gear for a video projection system. In order to communicate with the video electronics, the control circuit 15 has an input $E_{VL}$ which is routed via DC isolation 16. The control circuit 15 receives a sync signal via this input, and this sync signal is used for the synchronization with the video electronics.

Figure 2:
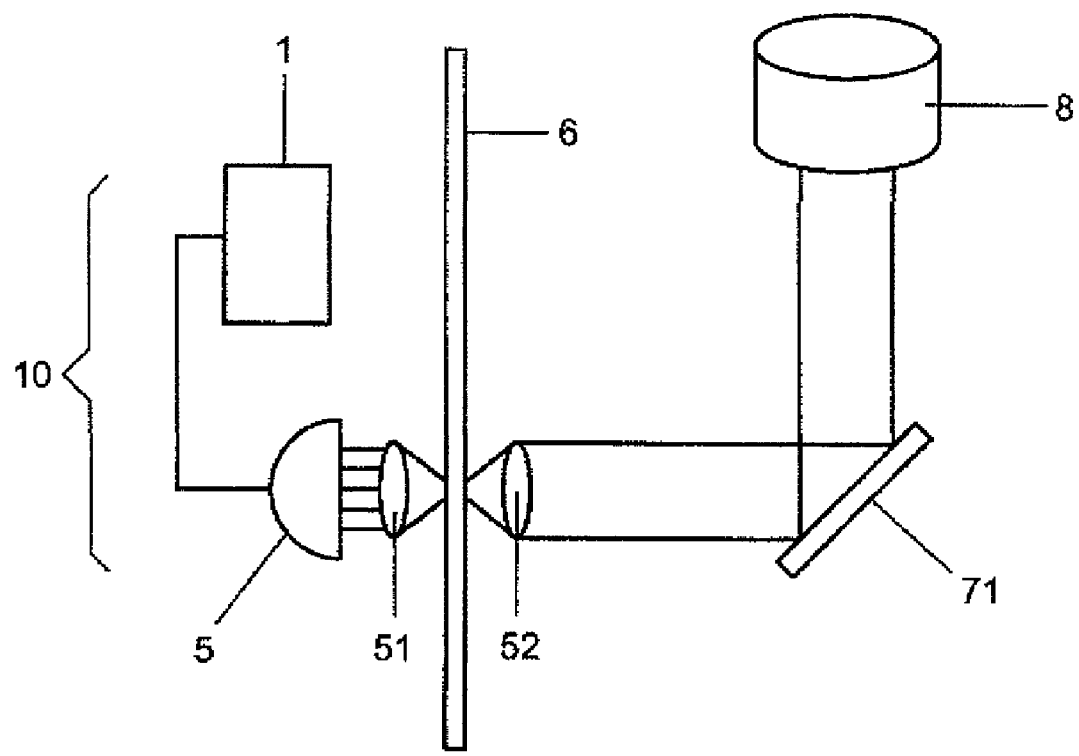
FIG. 2 shows a schematic sectional illustration of a video projection system.

In order to be able to represent the precise mode of operation of the method according to the invention, brief details will be given below of the way in which a video projection system functions, as is illustrated schematically in FIG. 2. The video projection system shown in FIG. 2 comprises a control gear 1 in accordance with the exemplary embodiment from FIG. 1. This control gear 1 operates the gas discharge lamp 5, which emits white light which is focused by means of an optical element 51, for example a lens, onto colored filters of a filter wheel 6. A further optical element 52, for example likewise a lens, is arranged downstream of the filter wheel 6 in the emission direction of the gas discharge lamp 6, and said further optical element 52 deflects the light selected by the filter wheel 6 onto a DMD chip 71.

The DMD chip 71 comprises microscopically small pivotable mirrors, which deflect the colored light either onto a projection optical element 8 or away therefrom, depending on whether the associated pixel is intended to be switched off or not. In other words, the DMD chip 71 comprises the light valves for controlling the individual pixels of the video projection system. In this case, the filter wheel 6 functions as a color modulator, which selects, sequentially one after the other, individual colors from the white light of the lighting device 10, which comprises the control gear 1 and the gas discharge lamp 5. In the present exemplary embodiment, the filter wheel 6 contains a red filter, a green filter and a blue filter.

Figure 3:
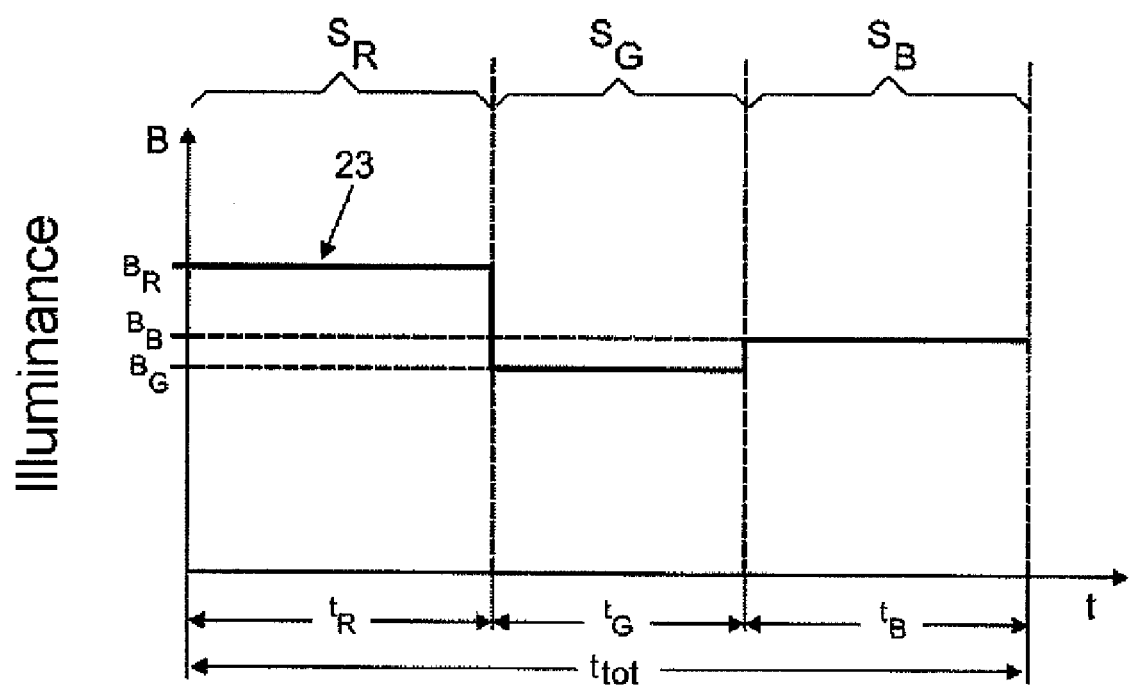
FIG. 3 shows a graph showing the illuminance over the time period of a complete color wheel run.

A light curve 23 which is stored in the control gear 1 of the lighting device and is illustrated in FIG. 3 in this case comprises three segments $S_R$, $S_G$, $S_B$, which are associated with the individual colors of the filters of the filter wheel 6, namely red, green and blue. The first segment $S_R$ has a time interval $t_R$ during which the light curve 23 has a constant illuminance $B_R$. The first segment $S_R$ is associated with the color red, i.e. the red filter of the filter wheel 6 selects red light from the white light of the lighting device 10 during the time interval $t_R$. After the time interval $t_R$, the illuminance of the light curve changes to the illuminance $B_G$, which is kept constant during a time interval $t_G$ of the second segment $S_G$, which is associated with the color green. The green filter of the filter wheel 6 therefore selects green light from the white light of the lighting device 10 during the time interval $t_G$. Once the time interval $t_G$ has elapsed, the filter wheel 6 changes to the blue filter and the light curve 23 into the third segment $S_B$. This means that the illuminance of the light curve 23 changes to the value $B_B$, which is kept constant during a time interval $t_B$. Owing to different values for the illuminance within the various segments $S_R$, $S_G$, $S_B$ of the light curve 23, which are associated with the individual colors red, green and blue of the filters of the filter wheel 6, the illuminance of the lighting device 10 is matched in such a way that the brightnesses of the individual colors red, green and blue correspond to a desired value, which result in a predetermined color temperature of the display system. The three segments $S_R$, $S_G$, $S_B$ of the light curve 23 form a period of the light curve 23 which has a duration of between 16 ms and 20 ms, inclusive.

A polarity reversal of the lamp current preferably takes place when the filter wheel 6 changes the colors. At this time, the light signal is blanked by the DMD chip 71 in order to avoid undesirable color blurring. In order to synchronize the polarity reversal of the lamp current, the video electronics transmit a sync signal to the control circuit 15, which then converts this sync signal into corresponding driving of the inverter 13.

A further source for rapid changes in the lamp current is the so-called maintenance pulse. This is known from EP 766906 B1, for example. The pulse is superimposed on the normal square wave, preferably shortly before and/or shortly after the commutation, i.e. the polarity reversal of the lamp current. The pulse is used for shaping and maintenance of the electrode tips of the gas discharge lamp. The maintenance pulse is also known in the case of gas discharge lamps which are operated in the DC operating mode, however. As a result of this pulse, considerable changes in the lamp current occur within a square-wave half-cycle and can be compensated for particularly well with the method according to the invention.

As a result of the fact that the information for the maintenance pulse and the information for the setting of the color locus with reference to the light curve are stored in the control gear, the operating method according to the invention can be used in a simple and efficient manner. The control circuit 15 inputs the switching frequency and the lamp power or the lamp current as setpoint value to the inverter 13. Since the control circuit 15 knows when the next commutation or the next maintenance pulse occurs, it can cancel the setpoint value for the converter frequency shortly before this time. This means that the DC/DC voltage converter 11 can respond substantially more quickly to the now occurring changes in current and the desired curve shape is reproduced more effectively.

Figure 4:
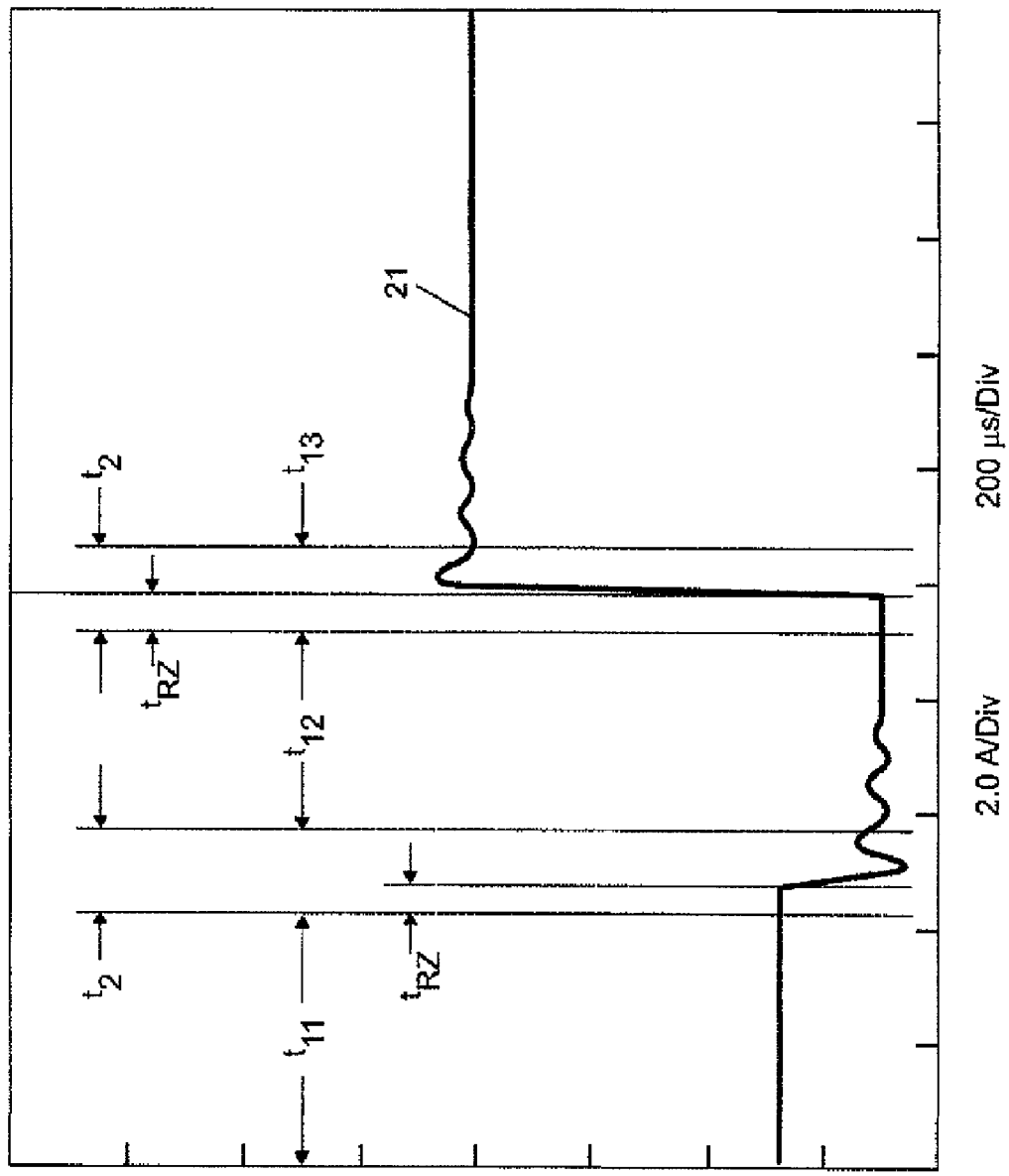
FIG. 4 shows a graph showing the light source current with time periods for the normal and increased converter frequency in accordance with the method according to an embodiment of the invention.

FIG. 4 illustrates, by way of example, a half-cycle of the lamp current 21. During the time spans $t_{11}$, $t_{12}$ and $t_{13}$, in which the lamp current is not changed to a marked extent, the DC/DC voltage converter 11 is operated at a first frequency. This normal value for the frequency is selected such that the losses of the converter are minimized. Preferably, the converter is therefore operated in the intermittent operating mode or at the boundary frequency between the intermittent and non-intermittent operating modes.

The intermittent operating mode is used here to refer to the operating mode of a pulsed switched-mode regulator, in which the current through the switch becomes zero prior to said switch making. The non-intermittent operating mode is used to refer to the operating mode of a pulsed switched-mode regulator, in which the current through the switch has not reached zero prior to said switch making. In the non-intermittent operating mode, switching losses therefore occur. The most favorable operating mode for a pulsed switched-mode regulator is operation at the boundary between the intermittent and non-intermittent operating modes. At this operating point, the losses are minimal in comparison with the power transmitted.

During the time spans $t_2$, the frequency of the DC/DC voltage converter 11 is increased by an increase value, in order to be able to better compensate for the considerable changes in current. Since the DC/DC voltage converter has a certain inertia as a result of its components forming the impedance, such as inductances and capacitors, the change in the setpoint value of the frequency takes place in a time span $t_{RZ}$ prior to the change in the setpoint value of the lamp current. After the change in the setpoint value of the lamp current, a certain latency $t_2-t_{RZ}$ is included, during which latency the lamp current has safely changed. Then, the frequency is lowered to the first frequency again by the increase value. During the time spans $t_2$, in which the DC/DC voltage converter is operated at an increased frequency, it may arise that the mode of operation falls in the non-intermittent operating mode. Since the time spans $t_{11}$, $t_{12}$ and $t_{13}$ are very long in comparison with the time spans $t_2$ and, when seen overall, make up the greatest temporal component of the lamp current, the losses are kept low overall, however. The increased losses during the time spans $t_2$ are knowingly accepted since these time spans are very short and the total efficiency of the system is only slightly impaired. If the DC/DC voltage converter is designed for the first frequency, however, it is less expensive to manufacture than if it were to be designed for the higher, second frequency.

In applications with semiconductor light sources, such as light-emitting diodes, for example, the method according to the invention is likewise advantageous. Precisely in the case of projection applications with light-emitting diodes, the various light-emitting diode sections which generate the various colors, for example red, green and blue, are driven afresh for each pixel. In the case of different colors and brightnesses for two adjacent pixels, the changes in current through the light-emitting diodes are sometimes very great. By virtue of the method according to the invention, the considerable changes in the current through the light-emitting diodes are managed significantly better than was previously possible.

With the measure according to the invention, the closed-loop control characteristic of the control gear with respect to rapid changes in the light source current is significantly improved, and the problems mentioned at the outset are reduced. By virtue of the fact that the DC/DC voltage converter is designed for the first frequency, the costs of the control gear which is operated with the method according to the invention are not increased in comparison with the known prior art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for the closed-loop control of the operation of a light source which is supplied with power by a DC/DC voltage converter, a manipulated variable being regulated by a setpoint value for an operational parameter of the DC/DC voltage converter being input, wherein the method comprises the steps of:
increasing the switching frequency of the DC/DC voltage converter by an increase value prior to rapid changes in the setpoint value;
waiting for a retention time;
setting a new setpoint value;
waiting for the end of a total retention time; and
lowering the switching frequency of the DC/DC voltage converter by the increase value.

2. The method as claimed in claim 1, wherein the setting of the new setpoint value is performed during the retention time.

3. The method as claimed in claim 1, wherein the setting of the new setpoint value is performed during the total retention time.

4. The method as claimed in claim 1, wherein the light source is operated on a square-wave current.

5. The method as claimed in claim 1, wherein the rapid changes in the setpoint value are the polarity reversal of the light source current.

6. The method as claimed in claim 1, wherein the light source is operated on a direct current.

7. The method as claimed in claim 1, wherein the rapid changes in the setpoint value are the beginning or the end of a maintenance pulse for a gas discharge lamp.

8. The method as claimed in claim 1, wherein the rapid changes in the setpoint value are the beginning or the end of a color wheel section, by means of which the light source current is synchronized.

9. The method as claimed in claim 1, while it is operated at a first frequency, the DC/DC voltage converter is in intermittent—respectively, operating mode or at intermittent—respectively, between the intermittent and non-intermittent operating modes.

10. The circuit arrangement as claimed in claim 9, wherein the light source is a gas discharge lamp.

11. The circuit arrangement as claimed in claim 9, wherein the light source is a semiconductor light source.

12. The method as claimed in claim 1, wherein the DC/DC voltage converter transfers to a non-intermittent operating mode when it is operated at the increased frequency.

13. A circuit arrangement for operating light sources, having a DC/DC voltage converter and a control circuit, using a method as claimed in claim 1.

* * * * *